Oct. 15, 1940.  H. E. GRAY ET AL  2,218,466
PROCESS AND APPARATUS FOR PEELING FREESTONE PEACHES
Filed Aug. 23, 1938
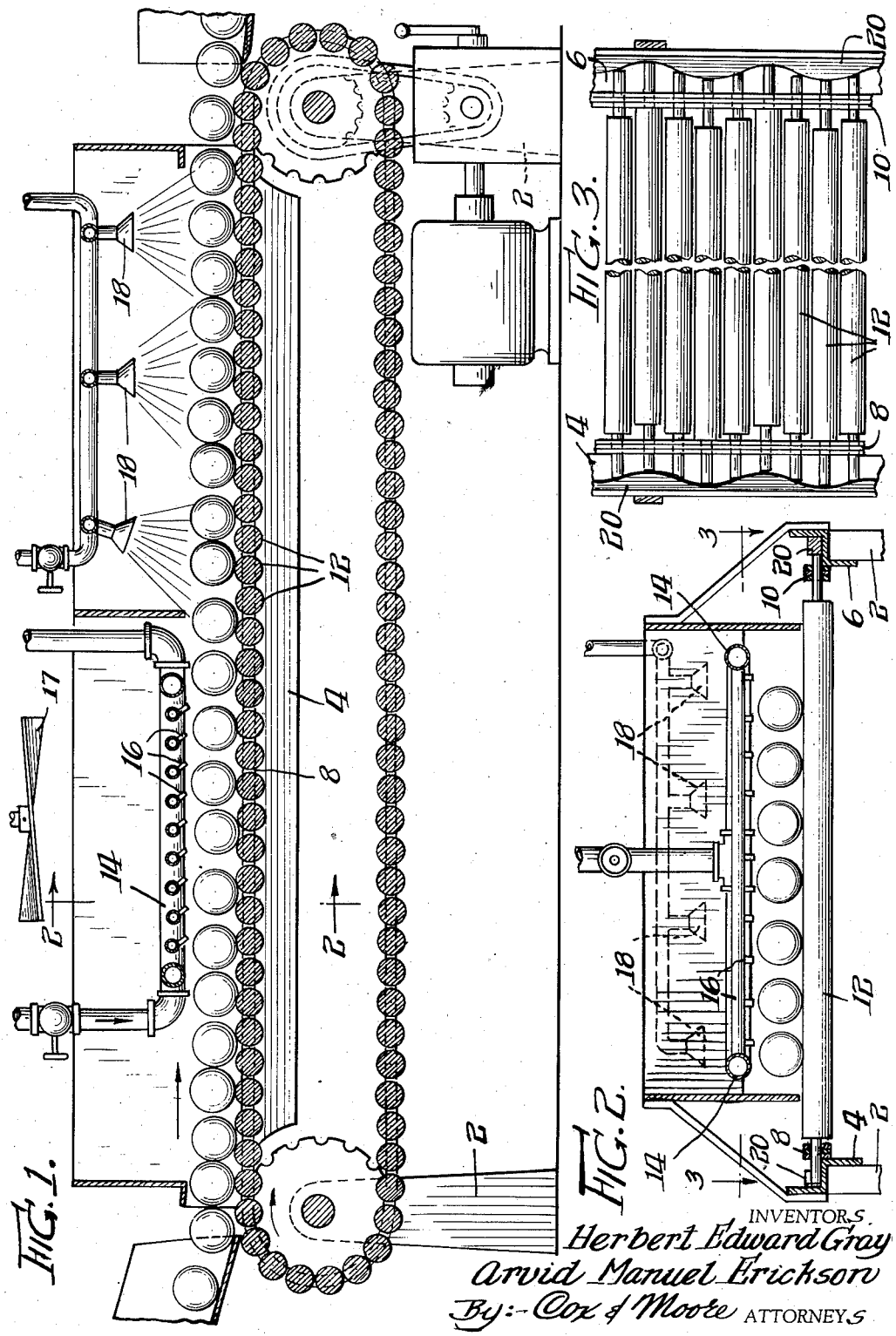

Patented Oct. 15, 1940

2,218,466

UNITED STATES PATENT OFFICE 2,218,466

PROCESS AND APPARATUS FOR PEELING FREESTONE PEACHES

Herbert Edward Gray and Arvid Manuel Erickson, San Jose, Calif., assignors to Barron-Gray Packing Company, San Jose, Calif., a corporation of California Application August 23, 1938, Serial No. 226,286

3 Claims. (Cl. 146—43)

This invention relates to a process and apparatus for peeling fruits, such as freestone peaches.

Among the objects of the present invention are to provide a process and apparatus for peeling fruits wherein the application of relatively intense radiant heat for a relatively short period of time is utilized to convert the moisture and/or air immediately beneath the surface of the skin into steam, to cause inflation or the blistering and consequent loosening of the skin from the flesh proper of the fruit whereby to permit the ready removal of the skin from the fruit or vegetable, and the process is effected in a manner such that the flesh of the fruit is not charred, burned, discolored or otherwise impaired in taste or quality; to provide an improved process and apparatus for peeling fruits or vegetables involving the application of an intensely hot flame directly into contact with the skin of the fruit to cause a blistering of the skin of the fruit and preferably without in any way charring the skin of the fruit or vegetable in such a manner as to leave the flesh thereof unimpaired while at the same time permitting the instant removal of the skin by hand or through any mechanical agency; to provide an improved apparatus for carrying out the foregoing method which includes the utilization of a cooling agency for the immediate cooling of the fruit after the same is subjected to an intense heat as heretofore described whereby immediately to cool down the fruit to substantially normal temperature for permitting the instant removal of the blistered skin and permit subsequent preparation of the fruit; to provide improved process and apparatus for peeling fruit by the application of intense heat such as for instance by the application of direct flame or radiant heat to the skin of the fruit to create a blistering action thereon so as to separate the skin from the flesh of the fruit, whereby the same can be subsequently removed in a similar manner and without impairing the flesh of the fruit and whereby also the heating action serves to drive out the precluded air in the superficial cells of the fruit thereby processing the surface of such flesh in such a manner as to preclude oxidation of this peeled surface for a considerable period of time as compared with the substantially immediate oxidizing effect of peeled fresh fruit when subjected to the air; to provide a substantially quicker process and apparatus for peeling fruit in such a manner as to permit instant removal of the peeling without removal of any of the fruit, without subsequent oxidation of the flesh of the fruit or vegetable for a considerable period of time, and without impairment either in color or appearance of the flesh of the fruit; to provide a process and apparatus for not only loosening and permitting the instant peeling of the skin from the fruit but likewise in a manner by application of relatively intense heat for carrying out the peeling operation, to create a blanching effect upon the exposed surface of the flesh of the fruit whereby to exercise a preserving operation, enhancing the retention of color and flavor in the flesh of the fruit thus peeled; to provide a substantially quicker process and apparatus for peeling freestone peaches, and other fruits having a substantially similar skin construction wherein the skin is loosened in the minimum of time for instant removal by hand or mechanical means, leaving the flesh unimpaired in appearance, taste, quantity and quality; to provide an improved process and apparatus for peeling fruits in such a manner that the flesh of the fruit is not likewise processed in any deleterious manner by the peeling operation and particularly wherein the entire flesh of the fruit is wholly preserved and is not cut, burned, discolored, bleached or otherwise impaired in quality, appearance, flavor and bouquet; to provide these and other objects of invention as will be apparent from a perusal of the following specification when taken in connection with the accompanying drawing, wherein:

Fig. 1 is a longitudinal sectional view of an apparatus for carrying out the improved process of the instant application;

Fig. 2 is a transverse sectional view taken on the line 2—2 of Fig. 1; and

Fig. 3 is a fragmentary plan sectional view taken on the line 3—3 of Fig. 2.

In the present invention the fruit, either whole or sections thereof, but preferably whole, is subjected to the action of relatively intense heat for a relatively short period of time and in such a manner as to cause the heat to inflate or blister the skin of the fruit immediately to loosen the skin from the fleshy surface of the fruit so as to permit the subsequent instant and easy removal of the skin from the flesh of the fruit. This application of the heat to the skin of the fruit or vegetable is preferably carried out in such a manner that the relatively intense heat applied for a relatively short period of time will not char or burn the skin of the fruit while effecting the blistering action and therefore will not impair, burn or injure the underlying flesh of the fruit. This loosening of the skin is effected without the use of steam or hot water or lye or other solution whereby the entire fleshy part of the fruit remains unimpaired, undiscolored and with its virgin quality in appearance and preservation.

The invention is applicable to any type of fruit having a skin of sufficient thickness so that when subjected to the proper action of sufficient heat for a relatively short time there will be produced an inflating or blistering action on the skin, instantly separating it from the flesh of the fruit, enabling subsequent instantaneous and facile removal either by hand or through mechanical agents. The present invention has been illustrated in connection with the peeling of freestone peaches. It is intended that the process and apparatus herein described is likewise applicable to any type of fruit having the skin structure which will thus blister and loosen under the application of the heating conditions substantially as herein specified so as to permit the subsequent instantaneous and quick removal of the skin, leaving the flesh of the fruit in its substantially pristine condition.

In the present invention the heating effect is not accomplished by steam or hot liquid but is effected by either radiant heat or a flame applied directly to the skin of the fruit. The skin is heated by the direct application of a flame or by the direction or projection of the heat from a flame or heating element onto the skin of the fruit. The heating effect is controllable either by regulating the intensity of the heat and/or by the length of time in which the skin of the fruit is subjected to a particular heat intensity. The intensity of the heat is in turn governed by the type of heat agency utilized and/or also by the manner of application of the heat to the skin of the fruit. The invention comprehends the utilization of a flame, and also comprehends the utilization of any type of control means for controlling the intensity of the heat and also its projection into contact with the skin of the fruit.

The heating effect is produced in a minimum of time ranging from two or three seconds to ten to fourteen seconds in the case of freestone peaches.

The drawings of the present application disclose a very simple type of the many different types of means for carrying out the process disclosed herein. Referring to the drawing in detail, there is illustrated any suitable type of standard or support 2 forming at its top a suitable trackway comprising spaced apart, longitudinally extending track bars 4 and 6 along which is propelled an endless belt composed of a pair of chains 8 and 10 carrying a series of slightly spaced apart rollers 12. These rollers form the means for supporting the fruits as they pass through the heating zone and also as they pass through the cooling zone hereinafter described. The rollers 12 as they approach the in-feeding end of the track are adapted to roll across the track bars 4 and 6 so as to produce a rotating or roller action and on each of the rollers continuously to roll, agitate or turn each individual fruit as it passes through the heating zone whereby the heat is uniformly and continuously applied to all of the superficial skin area of the fruit. A suitable adjustable speed motor operates the conveyor.

Means are provided preferably directly over the path of movement of the fruit hereinbefore described for providing the heating agency. In the present instance this heating agency comprises a suitable supporting frame 14 carrying a grid of gas burners 16. The burner nozzles are projected downwardly in such a manner as to cause the flame issuing from each nozzle directly to strike the skin of each individual fruit as it is carried by the conveying means under the heat jets, the fruit being continuously turned while thus subjected to the heating action.

If desired, any type of simple means may be provided for confining the heating directly onto the fruit. A simple means is by the utilization of a fan 17 disposed above the heat grid and arranged so as to blow the heat burning gases downwardly, maintaining the same directly upon the moving fruits, thereby intensifying or projecting the heat more intimately and directly into contact with the skin of the fruit.

Any type of adjustable means for the gas burners is provided to control the intensity of the heating flame and likewise in controlling the extent of projection of these flaming jets as they strike and directly contact the skin of the moving fruit. As the fruits or vegetables are carried under the heating zone the intensely hot flames directly strike the skin of the fruit, and as the latter turn under the action of the conveyor, the intense heat will cause the skin to blister without charring or burning, and this heating action or blistering action will substantially instantaneously convert the moisture in the fleshy surface of the fruit immediately under the skin or the moisture in the undersurface of the skin into steam which will cause the instantaneous separation of this skin from the flesh of the fruit. Noticeable swells or inflation of the skin of the fruit or vegetable coextensively with the surface of the skin is thus produced, which leaves the skin in a loose condition lying in its normal position with respect to the fresh fruit and protecting the flesh thereof. In some instances, as in the case of pears, the blistering effect is caused by the creation of relatively smaller blisters than in the case of freestone peaches. Each fruit may produce a slightly different effect. In each instance the skin will be substantially instantly loosened. It is desirable not to char or burn the skin. In the apparatus now in use, the skin of freestone peaches is effectively loosened in about twelve to fourteen seconds, more or less. This time element is capable of even shorter duration with improved heaters.

After the fruit passes from the heating zone it is then carried by the roller conveyor directly under a series of water spray jets 18 which are fed from another convenient source. These jets are directly over the travel conveyor and are arranged instantly to project cooling water or cooling air if desired upon the blistered fruit whereby to cool the same to substantially normal temperature so that they may be handled in such a manner as to permit and/or to facilitate the instant and easy removal of the skins and also whereby the cooling agency permits the handling of the fruit or subsequent treatment, such as for instance, in the case of peaches, splitting, pitting and cutting, and in some instances it may be desired to retain the fruit in whole condition merely with the skin removed.

After the fruits and vegetables pass from the cooling zone they are then discharged in continuous fashion to any type of processing table. In the case of freestone peaches they may be deposited upon a traveling elongated table along which a number of operators are stationed who grab each peach and remove the skin merely by rubbing or squeezing the skin, the skin instantly coming off, leaving the flesh slick, smooth and unimpaired in quality, shape, taste, bouquet and condition. In addition, these peeled peaches are passed on by the conveyor where they may be halved and pitted and/or they may be sliced if desired.

By the foregoing process it will be noted that fruits of suitable type, particularly freestone peaches, are quickly and continuously processed by the application of heat in such a manner as to permit the completely instant removal of the skin for easy and quick detachment as by a simple friction, squeezing or rubbing operation and in a manner such that a whole flesh fruit is left unimpaired both as to shape and size and also as to original bouquet, color and appearance. It is thought that during the heating action the creation of the steam or vapor beneath the skin of the fruit as it creates the blistering effect and thus loosens the skin completely from the flesh likewise in some manner creates a blanching effect upon the flesh of the fruit because it is noticed that peaches thus peeled do not oxidize and discolor for a considerable length of time when exposed to air as compared with peaches peeled by other processes which do not include some solution or agent for directly preventing this objectionable oxidation. It will also be noticed that by means of this improved process the peeling is carried out without the removal of any of the original flesh of the fruit, as distinguished from a cutting peeling operation. In addition this process is carried out without the discoloring of the flesh of the fruit or without altering the taste of the original flesh of the fruit as in the case of the use of lye or other solutions for removing the peel as heretofore practiced in connection with the peeling of clingstone peaches.

In carrying out the present process the skin of the fruit acts as a protection for the flesh thereof during the heating action. In short, in some instances the skin of the fruit may be loosened completely at the initial portion of the heating zone but the loosened skin completely overlying the flesh of the fruit acts as a complete protection thereby preventing the flames or heat from affecting the underlying flesh. It is thought that the steam created is caused by the heating of moisture either on the surface of the flesh of the fruit or on the inner surface of the skin of the fruit.

It is to be understood that the arrangement and distribution of the burners is not limited to that shown since it is only the contemplation of this invention to arrange the burners beneath specified portions of the conveyor or to arrange the burners laterally in position sufficient to project the flames or the heat in contact with the skin in such a manner as to accomplish the object desired.

In connection with the conveying mechanism herein described, it must be apparent that any means may be provided for imparting a longitudinal action to the individual rollers making up the conveyor in addition to the rotating motion caused by each of these rollers. This longitudinal action may be provided by any desirable type of cam motion 20 and longitudinally slidable rolls and thus provides a somewhat universal agitation or rotary movement to each fruit. That is, each fruit in addition to rolling about one axis will likewise move on another axis so that the heating effect or contact of the flame will be coextensive with all portions of the skin of the fruit. It will also be noticed that in carrying out this improved process the heating effect is accomplished in a manner to prevent the charring or burning of the skin of the fruit. For instance, in the peeling of freestone peaches by this process, the heat treatment is applied only sufficiently long to effect the skin blistering and loosening action and without impairing the underlying flesh of the fruit, so that the flesh is preserved in its virginal bulk, shape, color, appearance, taste and original condition. In some instances it is desirable to have the traveling conveyor and rollers formed or covered with a non-heat conducting medium such as asbestos, whereby to prevent burning of the fruit by contact with the rollers. In the present apparatus the cooling of the rollers is protected by the jets of cooling water so that as the rollers pass through the cooling zone and return to the initial portion of heat or feeding end of the apparatus they are in a substantially cool condition as the fruits are fed thereonto.

It will also be noticed that by the present invention the penetration of the heat into the flesh of the fruit is prevented so that deterioration of the product is eliminated, since the application of the flame is confined to the skin and this application is of such short duration as to substantially prevent heat penetration. As a result of this process the amount of discarded or injured fruit is a relatively smaller percentage over existing methods. In addition a pack is greatly improved both in color, texture and general appearance, and also a greater amount of fruit per pack is produced whereby canning costs are considerably reduced. Also, it is thought that due to the projection of the intense flame for a short period of time in contact with the skin of the fruit, the air in the fruit cells underlying the skin of the fruit is burned or is driven out or caused to disappear simultaneously in the creation of the steam and the creation of blisters in the skin of the fruit. This elimination of air, it is thought, prevents oxidation of the flesh after peeling so that the flesh will retain its natural color for a considerable time after exposure to the air and without the use of salt or other solutions or steam blanches for preventing this oxidation.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A device for peeling whole freestone peaches, comprising a traveling conveyor composed of spaced-apart rollers upon which the whole peaches are adapted to be fed, means for moving the conveyor along a predetermined path to transport the peaches therealong, means forming a grid of flaming jets disposed directly over the path of travel of the peaches while carried upon the conveyor rollers, said jets being constructed and arranged to direct the flame downwardly into direct contact with the peaches while carried upon the rollers, means to actuate the rollers as they are moved along the path of travel for presenting fresh portions of the periphery of each peach to direct contact with the jets of flame, means for controlling the rate of travel of the conveyor whereby to cause the peaches to be subjected to the flame for not more than substantially fifteen seconds, and means disposed in the path of travel of the peaches as they pass from the zone of flame for subjecting said peaches to water whereby to cool and wash the peaches and whereby to cool the rollers.

2. A device for peeling whole freestone peaches, comprising a traveling conveyor composed of spaced-apart rollers upon which the whole peaches are adapted to be fed, means for moving the conveyor along a predetermined path to transport the peaches therealong, means forming a grid of flaming jets disposed directly over the path of travel of the peaches while carried upon the conveyor rollers, said jets being constructed and arranged to direct the flame downwardly into direct contact with the peaches while carried upon the rollers, means to actuate the rollers as they are moved along the path of travel for presenting fresh portions of the periphery of each peach to direct contact with the jets of flame, means for controlling the rate of travel of the conveyor whereby to cause the peaches to be subjected to the flame for not more than substantially fifteen seconds, means disposed in the path of travel of the peaches as they pass from the zone of flame for subjecting said peaches to a water spray whereby to cool and wash the peaches and whereby to cool the rollers, and means located above the grid of jets of flame for forcing air downwardly onto the peaches whereby to confine the flames and heat directly onto the peaches.

3. In combination, means providing a horizontally disposed conveyor having an upper and lower reach, said conveyor being formed of a plurality of spaced-apart substantially parallel elongated rollers, power actuated means for moving said conveyor along a predetermined horizontal path, means for feeding whole freestone peaches onto said rollers, means for causing said rollers to rotate as they travel along said path, means to give said rollers an endwise movement as they travel along, means disposed at the entering end of said peaches and above the path of said rollers comprising a grid of pipes, means for feeding gas into said grid of pipes, said grid comprising a plurality of downwardly-disposed jets adapted to be lighted to cause the downward projection of jets of flame to envelope the whole peaches carried by said rollers, a grid of water pipes disposed in the path of travel of said rollers, said water pipes being provided with a plurality of spray nozzles adapted to direct water downwardly onto the said peaches as they are carried along and passed from under the zone of flame whereby to cool and wash the peaches.

HERBERT EDWARD GRAY.
ARVID MANUEL ERICKSON.